United States Patent [19] [11] 3,882,123
Lindsay et al. [45] May 6, 1975

[54] 2,5-BIS-SUBSTITUTED AMINO-1,3,4-THIADIAZOLES AND METHOD OF USE

[75] Inventors: Harry Lee Lindsay; Robert Bruce Angier; Keith Chadwick Murdock, all of Pearl River, N.Y.

[73] Assignee: American Cyanamid Company, Stamford, Conn.

[22] Filed: Aug. 1, 1973

[21] Appl. No.: 384,641

[52] U.S. Cl. ...... 260/268 H; 260/306.8 D; 424/250
[51] Int. Cl. .......................................... C07d 51/70
[58] Field of Search ...... 260/306.8 D, 268 H, 268 B

[56] References Cited
OTHER PUBLICATIONS

Rao, Y. Ramachandra "Chemical Abstracts," Vol. 70, 1969 p. 3963X.

Primary Examiner—Donald G. Daus
Assistant Examiner—Jose Tovar
Attorney, Agent, or Firm—Ernest Y. Miller

[57] ABSTRACT

The preparation of 2,5-bis substituted amino-1,3,4-thiadiazoles having antirhinoviral activity, is described.

5 Claims, No Drawings

2,5-BIS-SUBSTITUTED AMINO-1,3,4-THIADIAZOLES AND METHOD OF USE

DESCRIPTION OF THE INVENTION

This invention is concerned with novel 2,5-bis-substituted amino-1,3,4-thiadiazoles having antirhinoviral activity.

In particular, this invention relates to compounds selected from those of the formula:

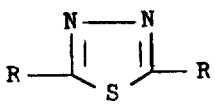

wherein R is cyclohexylamino, cyclopentylamino or N-loweralkylpiperazin-1-yl, and pharmaceutically acceptable acid addition salts thereof.

The present invention includes the pharmaceutically acceptable acid addition salts of the compounds of the above formula, which can be, for example, the hydrochloride, hydrobromide, sulfate, maleate and citrate, all of which are prepared by well known salt forming techniques.

The compounds of the present invention may be prepared by methods which can be graphically illustated as follows:

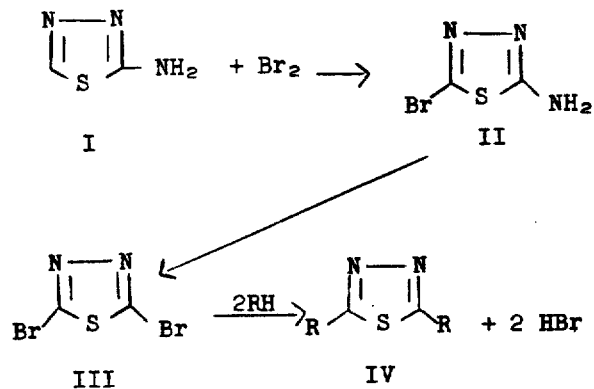

wherein R is as described above.

The 2-amino-1,3,4-thiadiazole (I), a commercially available product, in acetic acid is treated with bromine at 20°–60°C. to obtain 2-amino-5-bromo-1,3,4-thiadiazole (II). The compound (II) is then diazotized in phosphoric acid at −10° to +10°C. with sodium nitrite and then treated with copper sulfate and sodium bromide at −5° to +10°C. to obtain the 2,5-dibromo-1,3,4-thiadiazole (III). Compound (III) is then reacted with the desired substituted amine on a steam bath for 4 to 15 hours using either ethanol or excess amine as the solvent to obtain the desired 2,5-bis(substituted amino)-1,3,4-thiadiazole.

Specific compounds which can be prepared by the above method are, for example, 2,5-bis(cyclohexylamino)-1,3,4-thiadiazole, 2,5-bis(cyclopentylamino)-1,3,4-thiadiazole, 2,5-bis(N-methylpiperazin-1-yl)-1,3,4-thiadiazole and 2,5-bis(N-ethylpiperazin-1-yl)-1,3,4-thiadiazole.

The compounds of the present invention exhibit antiviral activity against a variety of rhinoviruses.

Confluent monolayers of a continuous cell-line such as HeLa, HEp-2, KB or L-132 grown in plastic tissue culture dishes were infected with one of the viruses causing respiratory illness such as the "common cold." These viruses include members of the picornavirus group including the rhinoviruses, for example, types 1B, 2, 5, 14, or 23 and including the enteroviruses, for example, Coxsackie A-15 or A-21. Protection of the tissues to the cytopathic effects of the viruses was ascertained by means of a plaque inhibition test in which the test compound was adsorbed onto a filter paper disc and placed on the agar used to overlay the infected cell monolayers, or by incorporation into the said agar overlay. The agar overlay medium used for this purpose was of the following formulation:

Minimum Essential Medium (Eagles) containing Earle's Salts* and to which has been added

| | |
|---|---|
| Ionagar No. 2 | 0.4% |
| Diethylaminoethyl dextran | 0.01% |
| Magnesium chloride | 0.06% |
| Fetal Calf Serum | 2% (v/v) |

*Obtained from Grand Island Biological Co., Grand Island, New York.

The virus-infected cell monolayers plus test compound were incubated for 3 to 5 days in a humidified atmosphere of 5% carbon dioxide at either 33° or 37°C., depending on the virus. The ability of these compounds to protect tissues from destruction by the viruses was then evident after staining the residual, uninfected, cells with 0.5% crystal violet in 20% ethanol.

A summary of the results obtained in the areas tested is shown in Table I.

TABLE I

| Compound | Rhinoviruses | | | | |
|---|---|---|---|---|---|
| | 2 | 5 | 14 | 23 | 1B |
| 2,5-bis(Cyclohexyl-amino)-1,3,4-thiadiazole | + | + | + | + | + |
| 2,5-bis(Cyclopentyl-amino)-1,3,4-thiadiazole | + | | | + | + |
| 2,5-bis(N-methyl-piperazin-1-yl)-1,3,4-thiadiazole | + | | | + | |

+ = Protects tissue from destruction by virus.

In addition, 2,5-bis(cyclohexylamino)-1,3,4-thiadiazole is also active in providing protection against Coxsackie A-15, Coxsackie A-21 and poliomyelitis viruses.

SPECIFIC DISCLOSURE

The following examples will serve to further illustrate in detail the preparation of representative compounds of this invention.

EXAMPLE 1

Preparation of 2-Amino-5-bromo-1,3,4-thiadiazole

Commercially available 2-amino-1,3,4-thiadiazole (50 gm., 0.5 mole) is dissolved in 250 ml. of acetic acid at room temperature. To this is added, all at once, 25 ml. (0.5 mole) of bromine. The temperature increases to about 55°C. after which the solution is allowed to stand at room temperature for one hour. The solution is then diluted with a solution of 40 gm. of sodium acetate in 400 ml. of water. The product crystallizes very quickly. After cooling overnight, the product is collected, washed with water and dried yielding 80 gm. of the product, melting point 176°C.

EXAMPLE 2

Preparation of 2,5-Dibromo-1,3,4-thiadiazole

A 27 gm. (0.15 mole) portion of 2-amino-5-bromo-1,3,4-thiadiazole is dissolved in 200 ml. of 85% phosphoric acid, cooled to 5°C. and 40 ml. of concentrated nitric acid is added. This mixture is cooled to 0°C. and a solution of 11.4 gm. (0.165 mole) of sodium nitrite in about 20 ml. of water is added dropwise while stirring at between −5°C. and 0°C. The solution is stirred another 15 minutes and then added slowly to a well-stirred solution of 28 gm. of cupric sulfate and 78 gm. of sodium bromide in 200 ml. of water held at between 0° and 5°C. The ice bath is removed and the mixture is stirred 2 hours at room temperature. The mixture is then poured into approximately 1600 ml. of water. This mixture is cooled overnight, the product is collected and air dried and then mixed with 125 ml. of chloroform, treated with activated carbon and filtered. The solution is evaporated to dryness under reduced pressure and 21.5 g. of yellow product is collected, melting point 111°-112°C.

EXAMPLE 3

Preparation of 2,5-Bis(cyclohexylamino)-1,3,4-thiadiazole

A solution of 29.2 gm. (0.12 mole) of 2,5-dibromo-1,3,4-thiadiazole and 62 ml. (53.5 gm., 0.532 mole) of cyclohexylamine in 360 ml. of ethanol is heated under reflux for 3¾ hours, treated with activated charcoal and filtered. The filtrate is diluted slowly with water while cooling to a final volume of 680 ml. This mixture is cooled overnight to give 21.0 gm. of crystalline product. This product is dissolved in 150 ml. of hot ethanol, treated with 7.5 gm. of activated charcoal and filtered. The filter cake is washed with 35 ml. of hot ethanol. The total filtrate is reheated to boiling, treated with 105 ml. of water and cooled to give 16.9 gm. of product. This product is recrystallized from 330 ml. of 5:1 ethylacetate:ethanol using 3 gm. of activated charcoal, yielding 10.2 gm. of product, melting point 202°-204°C.

EXAMPLE 4

Preparation of 2,5-Bis(cyclopentylamino)-1,3,4-thiadiazole

A solution of 12.20 gm. (0.05 mole) of 2,5-dibromo-1,3,4-thiadiazole and 17.03 gm. (0.2 mole) of cyclopentylamine in 150 ml. of ethanol is heated under reflux for 15 hours. The reaction mixture is evaporated to dryness and the residue is mixed with 150 ml. of water. After stirring for 3 hours, the remaining water-insoluble solid is still very greasy. A 50 ml. portion of toluene is added and the mixture is shaken vigorously. The mixture is filtered and the solid is washed twice with toluene, dried and then washed with water yielding 9.72 gm. of pale grey-tan solid. Recrystallization of this solid from 30 ml. of toluene and employing 10 gm. of activated charcoal gives 8.35 gm. of a mottled tan and brown solid. Recrystallization of this solid from a mixture of 60 ml. of toluene and 90 ml. of heptane followed by concentrating to about 35 ml. and washing once with toluene and twice with hexane yields 5.26 gm. of tan crystals, melting point 169°-172°C.

EXAMPLE 5

Preparation of 2,5-Bis(N-methylpiperazin-1-yl)-1,3,4-thiadiazole

A solution of 18.3 gm. (.075 mole) of 2,5-dibromo-1,3,4-thiadiazole in 60 ml. of N-methylpiperazine is heated on a steam bath for 4½ hours during which time a crystalline product separates. This mixture is then heated on a steam bath under the reduced pressure of a water pump for one-half hour. The residue is dissolved in 40 ml. of water with warming. This mixture is cooled and 16 ml. of 10N sodium hydroxide is added. The mixture is allowed to stand overnight. A small portion of the solvent is removed under reduced pressure, the solution is cooled and the product which precipitates is collected by filtration. The filtrate is repeatedly evaporated and cooled resulting in further precipitation of the product. The total precipitate (17.3 gm.) is combined and extracted with 40 ml. of boiling ethanol. The extract is warmed, treated with activated carbon, filtered and cooled, yielding 6.8 gm. of product. This product is recrystallized from 20 ml. of ethanol yielding 2.0 gm. of product. This product is again recrystallized from 10 ml. of ethanol yielding 1.4 gm. of product, melting point 154°C-156°C.

We claim:

1. A compound selected from the group consisting of those of the formula:

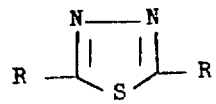

wherein R is selected from the group consisting of cyclohexylamino, cyclopentylamino and N-(lower alkyl of 1-2 carbon atoms)piperazin-1-yl, and pharmaceutically acceptable acid addition salts thereof.

2. The compound in accordance with claim 1, wherein R is cyclohexylamino.

3. The compound in accordance with claim 1, wherein R is cyclopentylamino.

4. The compound in accordance with claim 1, wherein R is N-methylpiperazin-1-yl.

5. A method of preparing compounds of the formula:

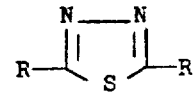

wherein R is selected from the group consisting of cyclohexylamino, cyclopentylamino and N(lower alkyl of 1-2 carbon atoms)piperazin-1-yl which comprises the step of heating 2,5-dibromo-1,3,4-thiadiazole with a compound of the formula (RH)$_2$ in which R is as defined above and recovering said product therefrom.

* * * * *